Feb. 26, 1946.    E. L. OLIVER ET AL    2,395,499
CONTINUOUS FILTER
Filed Oct. 8, 1943    3 Sheets-Sheet 1

INVENTORS
PHILIP J. McGUIRE
EDWIN L. OLIVER
JAMES E. SLAUGHTER
ARTHUR W. VETTAL
BY
ATTORNEY

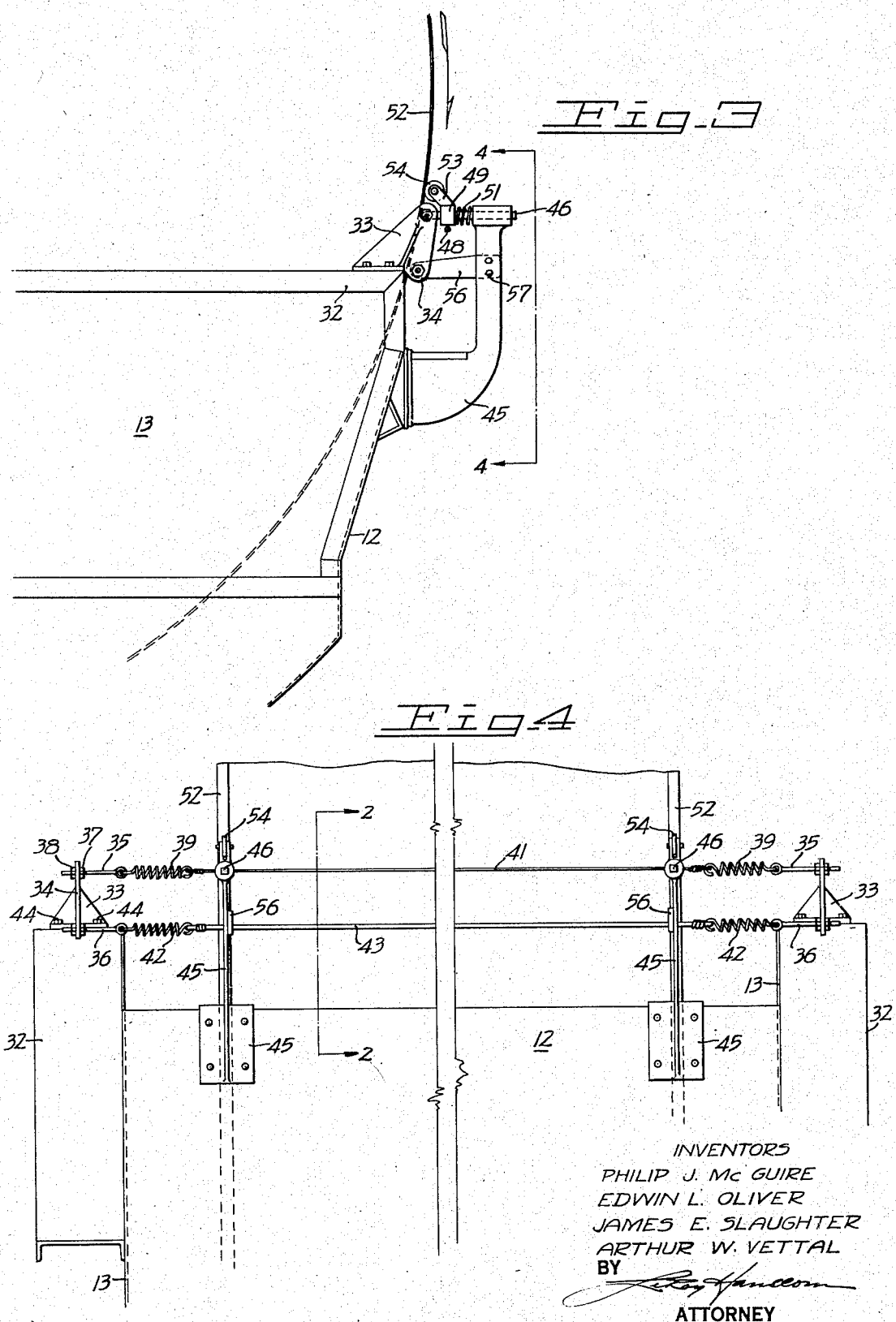

Feb. 26, 1946.  E. L. OLIVER ET AL  2,395,499
CONTINUOUS FILTER
Filed Oct. 8, 1943   3 Sheets-Sheet 3
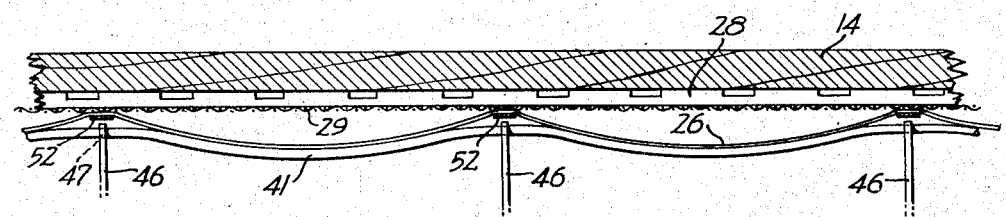
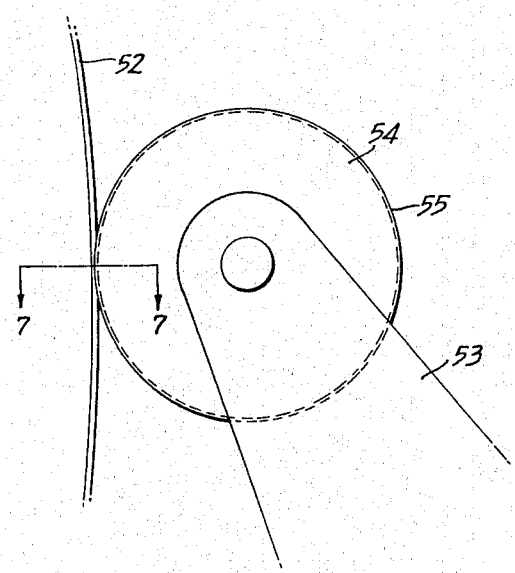
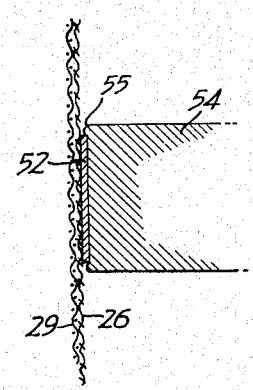
INVENTORS
PHILIP J. McGUIRE
EDWIN L. OLIVER
JAMES E. SLAUGHTER
ARTHUR W. VETTAL
BY
ATTORNEY Patented Feb. 26, 1946

2,395,499

UNITED STATES PATENT OFFICE 2,395,499

CONTINUOUS FILTER

Edwin Letts Oliver, Piedmont, Philip J. McGuire, San Francisco, James E. Slaughter, Santa Cruz, and Arthur W. Vettel, Watsonville, Calif.; said Oliver and said McGuire assignors to Oliver United Filters Incorporated, Oakland, Calif., a corporation of Nevada; said Slaughter and said Vettel assignors to The Permanente Metals Corporation, Oakland, Calif., a corporation of California Application October 8, 1943, Serial No. 505,460

7 Claims. (Cl. 210—199)

This invention relates in general to industrial filters wherein a filter cell travels in a predetermined path through a body of pulp or slurry to a discharge station, a layer of cake is deposited on the surface of the filter cell as it passes through the body of pulp or slurry under the influence of an inwardly directed differential filtering pressure, and the layer of cake so formed is discharged from said cell at the discharge station under the influence of a reverse fluid pressure.

More particularly this invention relates to a wire discharge mechanism for removing or discharging relatively thin, highly adherent cakes from a filter of the character above described.

The economic operation of an industrial filter depends among other factors upon the ability to cleanly discharge all solids deposited thereon during the so-called pick-up period. Although numerous devices are variously resorted to for this purpose, depending upon the character of the cake formed on the filter cell, there has been developed to date no means for effectively discharging relatively thin highly adherent cakes such as formed, for example, during the filtration of magnesium hydroxide.

In general, the object of this invention is the provision, in conjunction with a filter of the type above described, of a discharge mechanism comprising a pair of spaced parallel cords maintained resiliently under tension parallel with the surface of the filter cell at the discharge station and in the path of the cake carried by the filter cell or cells.

A further object of the invention is the provision of means operating on the first of said parallel cords for resiliently opposing the outward flexure of said cord due to the influence of the outward flexure of the filter medium carried by said cell when it is placed under the action of an outwardly directed reverse fluid pressure or blowback.

Still another object of this invention is the provision, in conjunction with a continuous rotary filter, of roller guides operating on the filter surface for resiliently maintaining the first of said pair of cords in contact with the drum surface irrespective of the fact that said drum may be out of round.

The invention possesses other advantageous features, some of which with the foregoing will be set forth at length in the following description, where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 3 is an enlarged detailed end view of the filter shown in Figure 1, better illustrating the construction of the mechanism for supporting our plural wire discharge.

Figure 4 is a front elevation of the structure shown in Figure 3, viewed in the plane indicated by the section line 4—4 of Figure 3.

Figure 5 is a fragmentary section taken on the plane indicated by the section line 5—5 of Figure 2.

Figure 6 is an end elevation of one of the guide rollers shown in Figures 1, 3 and 4.

Figure 7 is a fragmentary section taken on the plane indicated by the section line 7—7 of Figure 6.

Figure 1:
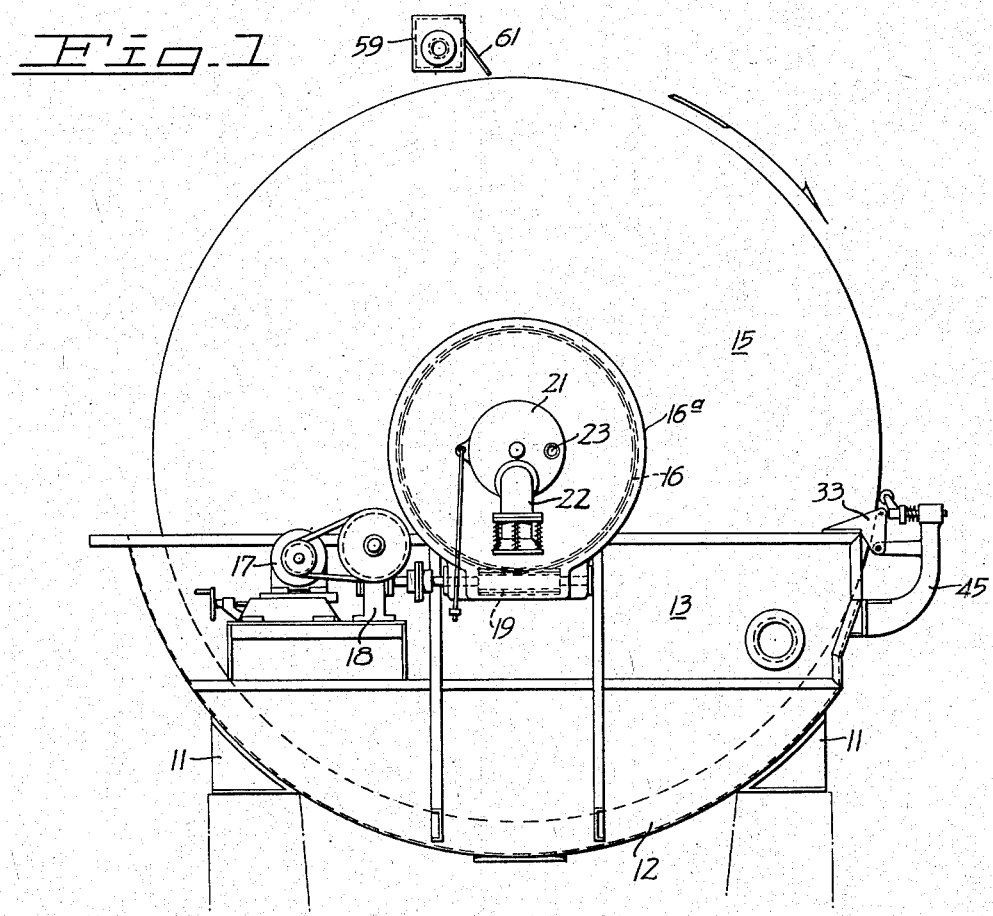
Figure 1 is an end elevation of a continuous rotary drum filter embodying the objects of our invention.

For purposes of illustration, our invention has been shown in the above figures in conjunction with a continuous rotary drum filter of the vacuum type comprising pedestals 11 supporting a filter tank 12, including tank heads 13. Arranged to rotate within the tank 12 is a filter drum 14 formed with drum heads 15 and supported in the usual fashion by trunnions journaled in bearings carried by the tank heads 13. In accordance with standard practice, there is keyed to one of the drum trunnions a ring gear 16, disposed in a gear housing 16—A, and through which the drum is driven by an electric motor 17, a suitable speed reducer 18 and a worm 19. Associated with the drive trunnion is an automatic filter valve 21, having a connection 22 communicating with a suitable source of vacuum, and a connection 23 communicating with a source of reverse fluid pressure. The automatic valve 21 is of conventional form, and serves successively to establish communication between the connections 22 and 23 and each of the filter cells or compartments presently to be described.

Figure 2:
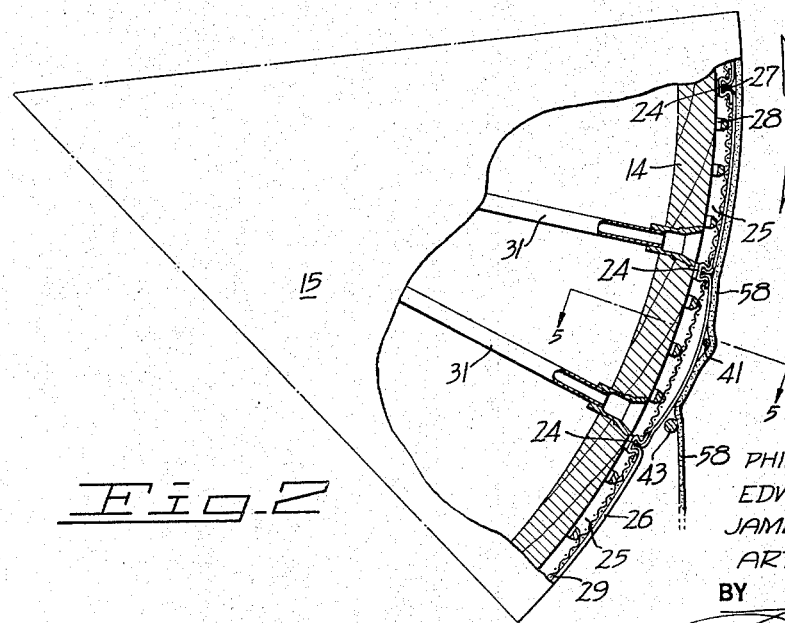
Figure 2 is an enlarged fragmentary section of the filter drum shown in Figure 1, and taken on the plane indicated on the section line 2—2 of Figure 4.

As best shown in Figures 2 and 5, there is secured to the outer surface of the drum 14 a plurality of peripherally spaced longitudinally extending division strips 24, in part defining a series of contiguous filtrate compartments or cells 25. The open side of each of these filtrate compartments or cells 25 is closed by a flexible filter medium 26 (which may, for example, be made of cotton duck or twill) secured within channels formed in the division strips 24, and in the drum heads 15 by calking strips 27 or any other suitable means. Disposed within each of the filtrate compartments 24 is a coarse drainage screen 28, and overlying each of these screens for the purpose of serving as a support for the filter medium 26 is a wire mesh supporting screen 29. Communication between each of the filtrate compartments or cells 25 and the automatic valve 21 is established by means of piping 31.

The filter as so far described is of conventional construction, such as, for example, resorted to in the continuous rotary drum filters of Oliver United Filters Incorporated.

Adjustably bolted to a portion of the tank head structure 32 at either end of the tank is a bracket 33 provided with a web 34, extending somewhat forward of the surface of revolution generated by each of the filtrate compartments 25. Threaded through openings formed in the web 34 are upper and lower eye bolts 35 and 36, to which are threaded on either side of the web 34, lock nuts 37 and 38. Secured to each of the upper eye bolts 35 is a tension spring 39, and secured to the inner ends of these springs and held thereby resiliently under tension across the face of the filter drum, in the path of the oncoming cake, is a section 41 of piano wire. Similarly secured to the lower eye bolts 36 are tension springs 42, and secured to the inner ends of these springs immediately across the face of the drum is a 3/8 inch diameter cord or rope 43. The brackets 33 are adjustably secured to the tank head portions 32 by machine screws 44 passing through slots formed in the foot of the brackets 33, so that the wire 41 and cord 43 may be located immediately adjacent to and just in contact with the filter medium 26.

To the upper edge of the tank 12 is secured a plurality of longitudinally spaced upwardly extending brackets 45, the outer ones of which are in vertical alignment with the drum heads 15. Slidably keyed within the upper end of each of the brackets 45 is a rod 46 in horizontal alignment with the piano wire 41, and formed in the inner end of the rod 46 is an eye 47 in alignment woth the piano wire 41 and through which the piano wire is threaded. Fastened to each of the rods 46, intermediate the filter drum and the bracket 45, by means of a set screw 48, is a collar 49, and compressed between this collar and the bracket 45 is a coil spring 51, urging the collar 49 and the rod 46 inwardly, and consequently serving to oppose the outward flexure of the piano wire 41 at this point.

With the construction so far described, the inner ends of the rods 46, through which the piano wire 41 is threaded, would ride on the surface of the filter medium, thereby subjecting the filter medium to undue wear. To avoid such wear, there is secured over the filter drum in the plane of each of the rods 46 a metal band 52, and the collar 49 is provided with a pair of up-standing ears 53, to which is journaled a roller 54, in rolling contact with its associated band 52.

Under certain condtions, the bands 52, although tightly secured over the filter drum, are subject to some lateral creepage, and to avoid this, the sides of the rollers 54 are formed with small flanges 55, which straddle the band, and thereby serve to maintain the band in alignment with its associated roller (see Figures 6 and 7).

Outward flexure of the cord or rope 43 at spaced points along the drum surface is prevented by threading the rope 43 through the ends of inwardly extending fingers 56, adjustably secured to the brackets 45 beneath the rods 46. Adjustment of the fingers 56 to and from the filter drum may be effected by forming slots in these fingers, and securing them to the bracket 45 by bolts or machine screws 57 threaded through the slots. Due to the difference in the function of the rope 43 from that of the function of the wire 41 (presently to be explained), there is no necessity for resiliently holding the rope 43 against the drum at spaced points thereon.

Each of the filtrate compartments or cells 25, defined in part by adjacent division strips, opposed drum heads and the filter medium 26 secured to these members, may be considered as individual filter panels. If a band is placed over the drum intermediate the ends of any one of the filtrate compartments, this compartment may be considered as having been divided by the band into two independent panels disposed end to end, and any filter involving this type of construction, may be referred to as a panel type filter. As each of these panels arrives at a point opposite the discharge station—that is, opposite the piano wire 41 and the cord 43—it is subjected to an outwardly directed reverse fluid pressure or blowback for the purpose of somewhat loosening the cake 58 carried by its filter medium. Upon the application of this blow-back, the section of flexible filter medium associated with each panel is outwardly flexed into pillow form, as shown in Figure 5. The function of the piano wire 41 is to lift the cake 58 away from the filter medium, and this can be effectively accomplished only if the wire is made to conform as closely as possible at all times during the discharge period to the pillow form of each of the panels being discharged. It is for this reason that the outward flexure of the piano wire 41 is resiliently opposed by the compression springs 51 at points opposite the ends of each of the panels. Although the piano wire 41 serves to lift the cake from its filter medium, once the cake has passed over the piano wire, contrary to expectation, it tends immediately to re-adhere to the filter medium, this action taking place even though the discharge station is below the horizontal center line of the drum as shown in Figure 2. The function of the rope or cord 43 is, therefore, to wipe from the filter medium the cake which has passed over the piano wire, and which has re-adhered somewhat to the drum. From this point on, the cake falls by gravity from the rope or cord 43. In this connection, it should be kept in mind that the wire discharge mechanism above described is particularly advantageous in discharging relatively thin, sticky cakes, and that there would be no particular reason for resorting to this type of discharge mechanism for discharging relatively non-adherent cakes.

For the filtration of magnesium hydroxide on a continuous rotary drum vacuum filter of the character above described, it has been found desirable to top feed the filter by means of a weir 59, provided with a depending lip 61. The magnesium hydroxide slurry is then fed to the weir 59 (as well as to the tank 12), from which it flows over the lip 61 to the drum at the zenith of the drum. However, the specific method of feeding the filter and forming the cake thereon is immaterial to the present invention.

We claim:

1. In a filter wherein a filter panel provided with a flexible filter medium travels in a closed path through a body of material to be filtered under the action of an inwardly directed differential filtering pressure, so as to pick up a cake on said filter medium, and wherein said filter panel is subjected to an outwardly directed reverse pressure at a discharge station for aiding in the discharge of said cake; means for further aiding the discharge of said cake comprising: a pair of spaced parallel cords disposed normally parallel with the surface generated by said filter panel, and in the path of the cake carried thereby; means for maintaining said cords under tension; and additional means for resiliently restraining the first of said cords at spaced points thereon from being outwardly flexed, due to the outward flexing of said filter medium when said filter panel is subjected to said reverse pressure.

2. In a filter wherein a filter panel provided with a flexible filter medium travels in a closed path through a body of material to be filtered under the action of an inwardly directed differential filtering pressure, so as to pick up a cake on said filter medium, and wherein said filter panel is subjected to an outwardly directed reverse pressure at a discharge station for aiding in the discharge of said cake; means for further aiding the discharge of said cake comprising: a pair of spaced parallel cords disposed normally parallel with the surface generated by said filter panel and in the path of the cake carried thereby; means for maintaining said cords resiliently under tension; and additional means acting at right angles to the first of said cords and at the ends of said filter panel for resiliently opposing the outward flexure of said first cord in response to the outward flexure of said filter medium when said filter panel is subjected to said reverse pressure.

3. In a filter wherein a filter cell, to the marginal edges of which is secured a flexible filter medium, travels in a predetermined path periodically through a body of pulp or slurry to a discharge station, and wherein a cake of solids is deposited on said filter medium under the influence of an inwardly directed differential fluid pressure while passing through said pulp or slurry, and wherein said cake is loosened from said filter medium at said discharge station through the action of an outwardly directed reverse fluid pressure; means for discharging said cake from said filter medium comprising: first and second spaced parallel cords located adjacent to and normally parallel with the surface of said filter cell at said discharge station and in the path of the cake carried on said cell; means for maintaining said cords under tension; and additional means for resiliently opposing any outward flexure of said first cord at the ends of said cell, due to the outward flexure of said filter medium when said cell is subjected to the action of said reverse fluid pressure.

4. In a filter wherein a filter cell defined on one side by a flexible filter medium travels in a closed path through a body of pulp or slurry to a discharge station, wherein said cell in passing through said body of pulp or slurry is subjected to an inwardly directed differential fluid pressure, with the consequent formation on said filter medium of a layer of cake, and wherein said cell upon approaching said discharge station is subjected to a reverse fluid pressure for loosening said cake from said filter medium, and which flexes said filter medium in outwardly convex pillow form; means for discharging said cake from said filter medium comprising first and second spaced parallel cords located at said discharge station normally parallel with said cell and in the path of the cake carried by its filter medium; means for resiliently maintaining said cords under tension; and additional means operating on said first cord at right angles thereto, and opposite the ends of said cell for resiliently opposing the outward flexure of said first cord under the influence of the outward flexure of said filter medium.

5. A continuous filter comprising: a filter tank; a filter drum arranged to rotate within said tank and provided on its periphery with a plurality of longitudinally extending filtrate compartments over each of which is secured a flexible filter medium; means for successively subjecting each of said compartments to an inwardly directed filtering pressure and to an outwardly directed reverse pressure for successively urging the filter medium associated with each of said filtrate compartments to assume an outwardly convex form; a pair of spaced parallel wires supported by said tank across and immediately adjacent the face of said filter drum on the descending side thereof; means for maintaining said wires under tension; longitudinally spaced wire retainers supported by said tank and associated with the upper one of said spaced parallel wires for restraining said wire from moving outwardly in response to the pressure exerted by the filter medium secured to each of said filtrate compartments; and means for resiliently urging said wire retainers toward said drum.

6. A continuous filter comprising: a filter tank; a filter drum arranged to rotate within said tank and provided on its periphery with a plurality of longitudinally extending filtrate compartments over each of which is secured a flexible filter medium, means for successively subjecting each of said compartments to an inwardly directed filtering pressure and to an outwardly directed reverse pressure for successively urging the filter medium associated with each of said filtrate compartments to assume an outwardly convex form; a pair of spaced parallel wires supported by said tank across and immediately adjacent the face of said filter drum on the descending side thereof; means for maintaining said wires under tension; longitudinally spaced wire retainers supported by said tank and associated with the upper one of said spaced parallel wires for restraining said wire from moving outwardly in response to the pressure exerted by the filter medium secured to each of said filtrate compartments; means for resiliently urging said wire retainers toward said drum; and rollers carried by said wire retainers arranged to ride on the cylindrical surface of said filter drum.

7. A discharger for rotary drum filters comprising: a wire held under tension immediately adjacent and substantially parallel to the axis of the drum of said filter; and means intermediate the ends of said wire for resiliently restraining it from flexing outwardly in response to any outward flexure of the filter medium carried by said filter drum.

EDWIN LETTS OLIVER.
PHILIP J. McGUIRE.
JAMES E. SLAUGHTER.
ARTHUR W. VETTEL.